United States Patent
Smith et al.

(10) Patent No.: US 9,812,684 B2
(45) Date of Patent: Nov. 7, 2017

(54) USING ELASTIC AVERAGING FOR ALIGNMENT OF BATTERY STACK, FUEL CELL STACK, OR OTHER VEHICLE ASSEMBLY

(75) Inventors: Mark A. Smith, Huntington Woods, MI (US); Xiang Zhao, Novi, MI (US); Ronald Charles Daul, Northville, MI (US); David A. Okonski, Lake Orion, MI (US); Lane G. Lindstrom, Oxford, MI (US); Elmer B. Santos, Rochester Hills, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1480 days.

(21) Appl. No.: 13/229,926

(22) Filed: Sep. 12, 2011

(65) Prior Publication Data

US 2012/0115010 A1 May 10, 2012

Related U.S. Application Data

(60) Provisional application No. 61/411,614, filed on Nov. 9, 2010.

(51) Int. Cl.
*H01M 2/00* (2006.01)
*H01M 2/10* (2006.01)
(Continued)

(52) U.S. Cl.
CPC ............ *H01M 2/1083* (2013.01); *B60K 1/04* (2013.01); *H01M 2/1077* (2013.01);
(Continued)

(58) Field of Classification Search
CPC .................................................. H01M 2/1077
(Continued)

(56) References Cited

U.S. PATENT DOCUMENTS

| 1,219,398 A | 3/1917 | Huntsman |
| 1,261,036 A | 4/1918 | Kerns |

(Continued)

FOREIGN PATENT DOCUMENTS

| CN | 1032581 A | 4/1989 |
| CN | 1036250 A | 10/1989 |

(Continued)

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(Continued)

*Primary Examiner* — Jacob Marks
(74) *Attorney, Agent, or Firm* — Cantor Colburn LLP (57) ABSTRACT

An assembly for a vehicle includes a first member including a plurality of elastically deformable locating protrusions extending outward, and a second member defining a cavity extending inward and including a plurality of elastically deformable compression features disposed within the cavity. The locating protrusions of the first member are disposed within the cavity of the second member in press fit engagement with the compression features of the second member to secure the first member relative to the second member. The average of the elastic deformation between all of the locating protrusions of the first member and all of the compression features of the second member precisely aligns the first member relative to the second member. The assembly may include but is not limited to a multiple unit battery pack, a multiple unit fuel cell pack, a dashboard assembly or adjoining body panels.

19 Claims, 4 Drawing Sheets

(51) Int. Cl.
    *B60K 1/04*        (2006.01)
    *H01M 8/2475*      (2016.01)
(52) U.S. Cl.
    CPC ....... *H01M 2/1094* (2013.01); *H01M 8/2475*
                (2013.01); *Y10T 29/49622* (2015.01)
(58) Field of Classification Search
    USPC ........................................................ 429/457
    See application file for complete search history.

(56)                References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,058,319 A | 10/1936 | Jones |
| 2,164,634 A | 7/1939 | Barrett |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,050,160 A | 8/1962 | Chesser |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,580,628 A | 5/1971 | Rantala |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,838,928 A | 10/1974 | Blaurock et al. |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,962,766 A | 6/1976 | Pompidor et al. |
| 3,967,351 A | 7/1976 | Rosenberg et al. |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,212,415 A | 7/1980 | Neely |
| 4,213,675 A | 7/1980 | Pilhall |
| 4,237,573 A | 12/1980 | Weihrauch |
| 4,267,680 A | 5/1981 | Delattre |
| 4,286,894 A | 9/1981 | Rongley |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,479,737 A | 10/1984 | Bergh et al. |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,715,095 A | 12/1987 | Takahashi |
| 4,745,656 A | 5/1988 | Revlett |
| 4,746,008 A | 5/1988 | Heverly et al. |
| 4,757,655 A | 7/1988 | Jentoft et al. |
| 4,767,647 A | 8/1988 | Bree |
| 4,778,282 A | 10/1988 | Borchardt et al. |
| 4,805,272 A | 2/1989 | Yamaguchi |
| 4,807,335 A | 2/1989 | Candea |
| 4,817,999 A | 4/1989 | Drew |
| 4,819,309 A | 4/1989 | Behymer |
| 4,819,983 A | 4/1989 | Alexander et al. |
| 4,828,423 A | 5/1989 | Cramer, Jr. et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,907,582 A | 3/1990 | Meyerrose |
| 4,909,929 A | 3/1990 | Tabor |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,007,759 A | 4/1991 | Scherer |
| 5,039,267 A | 8/1991 | Wollar |
| 5,094,580 A | 3/1992 | Abe |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,178,433 A | 1/1993 | Wagner |
| 5,180,219 A | 1/1993 | Geddie |

(56) References Cited

U.S. PATENT DOCUMENTS

| | | |
|---|---|---|
| 5,186,517 A | 2/1993 | Gilmore et al. |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A | 8/1997 | Berg et al. |
| 5,657,893 A | 8/1997 | Hitchings |
| 5,666,749 A | 9/1997 | Waters |
| 5,667,271 A | 9/1997 | Booth |
| 5,670,013 A | 9/1997 | Huang et al. |
| 5,671,513 A | 9/1997 | Kawahara |
| 5,671,696 A | 9/1997 | Liethen |
| 5,698,276 A | 12/1997 | Mirabitur |
| 5,702,779 A | 12/1997 | Siebelink, Jr. et al. |
| 5,704,753 A | 1/1998 | Ueno |
| 5,706,559 A | 1/1998 | Oliver |
| 5,736,221 A | 4/1998 | Hardigg et al. |
| 5,765,942 A | 6/1998 | Shirai et al. |
| 5,770,320 A | 6/1998 | Hughes et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,799,930 A | 9/1998 | Willett |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,865,500 A | 2/1999 | Sanada et al. |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,036,198 A | 3/2000 | Kramer |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,142,509 A | 11/2000 | White, Jr. et al. |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,213,677 B1 | 4/2001 | Yamane et al. |
| 6,237,344 B1 | 5/2001 | Lee |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 * | 10/2001 | Jones ............... F16B 2/06 439/571 |
| 6,311,960 B1 | 11/2001 | Pierman et al. |
| 6,318,585 B1 | 11/2001 | Asagiri |
| 6,321,495 B1 | 11/2001 | Oami |
| 6,324,732 B1 | 12/2001 | Arisaka et al. |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,594,861 B2 | 7/2003 | Dimig et al. |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 * | 1/2005 | Kobayashi et al. ......... 29/623.2 |
| 6,846,125 B2 | 1/2005 | Smith et al. |
| 6,857,676 B2 | 2/2005 | Kawaguchi et al. |
| 6,857,809 B2 | 2/2005 | Granata |
| 6,872,053 B2 | 3/2005 | Bucher |
| 6,895,651 B2 | 5/2005 | Li |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |

(56) References Cited

U.S. PATENT DOCUMENTS

| | | |
|---|---|---|
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | Dicesare |
| 7,275,772 B2 | 10/2007 | Lee |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,610,671 B2 | 11/2009 | Watkins et al. |
| 7,614,836 B2 | 11/2009 | Mohiuddin et al. |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 7,971,913 B2 | 7/2011 | Sunahara et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,187,369 B2 | 5/2012 | Rogers |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,328,250 B2 | 12/2012 | Botten et al. |
| 8,371,788 B2 | 2/2013 | Lange |
| 8,371,789 B2 | 2/2013 | Takita |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,520,404 B2 | 8/2013 | Hamaguchi |
| 8,572,818 B2 | 11/2013 | Hofmann |
| 8,579,141 B2 | 11/2013 | Tejima |
| 8,607,952 B2 | 12/2013 | Keating et al. |
| 8,619,504 B2 | 12/2013 | Wyssbrod |
| 8,648,264 B2 | 2/2014 | Masumoto |
| 8,656,563 B2 | 2/2014 | Hiramatsu et al. |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,756,787 B2 | 6/2014 | Zimmermann et al. |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,038,335 B1 | 5/2015 | Eck |
| 9,039,318 B2 | 5/2015 | Mantei et al. |
| 9,050,690 B2 | 6/2015 | Hammer et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 9,302,569 B2 | 4/2016 | Ogino et al. |
| 9,303,667 B2 | 4/2016 | Morris et al. |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1* | 4/2002 | Tsuji et al. ............... 429/34 |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0107202 A1 | 6/2003 | Tajima et al. |
| 2003/0108401 A1 | 6/2003 | Agha et al. |
| 2003/0180122 A1 | 9/2003 | Dobson |
| 2004/0016088 A1 | 1/2004 | Angellotti |
| 2004/0028503 A1 | 2/2004 | Charles |
| 2004/0037637 A1 | 2/2004 | Lian et al. |
| 2004/0052574 A1 | 3/2004 | Grubb |
| 2004/0083583 A1 | 5/2004 | Bradley |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0191123 A1 | 9/2005 | Wertz |
| 2005/0208375 A1 | 9/2005 | Sakurai |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yi |
| 2006/0113755 A1 | 6/2006 | Yokota |
| 2006/0125286 A1 | 6/2006 | Horimatsu et al. |
| 2006/0141318 A1* | 6/2006 | MacKinnon et al. .......... 429/34 |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |

(56) References Cited

U.S. PATENT DOCUMENTS

| | | |
|---|---|---|
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0011930 A1 | 1/2008 | Nagai |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0250609 A1 | 10/2008 | Franks |
| 2008/0260454 A1 | 10/2008 | Girodo et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0117319 A1 | 5/2009 | Hubert |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2009/0318069 A1 | 12/2009 | Konet |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1* | 3/2011 | Yamaura ............ 429/470 |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0194895 A1 | 8/2011 | Lai |
| 2011/0207024 A1* | 8/2011 | Bogumil et al. ......... 429/514 |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0212858 A1 | 8/2013 | Herzinger et al. |
| 2013/0269873 A1 | 10/2013 | Herzinger et al. |
| 2014/0132023 A1 | 5/2014 | Watanabe |
| 2014/0157578 A1 | 6/2014 | Morris et al. |
| 2014/0172112 A1 | 6/2014 | Marter |
| 2014/0175774 A1 | 6/2014 | Kansteiner |
| 2014/0199116 A1 | 6/2014 | Metten et al. |
| 2014/0202628 A1 | 7/2014 | Sreetharan et al. |
| 2014/0260041 A1 | 9/2014 | Peck |
| 2014/0264206 A1 | 9/2014 | Morris |
| 2015/0043959 A1 | 2/2015 | Morris |
| 2015/0069779 A1 | 3/2015 | Morris et al. |
| 2015/0093177 A1 | 4/2015 | Morris |
| 2015/0098748 A1 | 4/2015 | Morris et al. |
| 2015/0135509 A1 | 5/2015 | Morris et al. |
| 2015/0164184 A1 | 6/2015 | Morris et al. |
| 2015/0165986 A1 | 6/2015 | Morris |
| 2015/0167718 A1 | 6/2015 | Morris et al. |
| 2015/0192160 A1 | 7/2015 | Gong |
| 2015/0197970 A1 | 7/2015 | Morris et al. |
| 2015/0232130 A1 | 8/2015 | Colombo |
| 2015/0274217 A1 | 10/2015 | Colombo |
| 2015/0308534 A1 | 10/2015 | Smith et al. |
| 2015/0308538 A1 | 10/2015 | Morris et al. |
| 2015/0353028 A1 | 12/2015 | Courtin et al. |
| 2015/0375798 A1 | 12/2015 | Morris et al. |
| 2016/0200268 A1 | 7/2016 | Morris et al. |

FOREIGN PATENT DOCUMENTS

| | | |
|---|---|---|
| CN | 1062629 A | 7/1992 |
| CN | 1129162 A | 8/1996 |
| CN | 1205285 A | 1/1999 |
| CN | 1204744 A | 7/1999 |
| CN | 2458785 Y | 11/2001 |
| CN | 1328521 A | 12/2001 |
| CN | 1336843 A | 2/2002 |
| CN | 1426872 A | 7/2003 |
| CN | 1496451 A | 5/2004 |
| CN | 1670986 A | 9/2005 |
| CN | 100573975 C | 9/2005 |
| CN | 1693721 A | 11/2005 |
| CN | 2769458 Y | 4/2006 |
| CN | 1771399 A | 5/2006 |
| CN | 1774580 A | 5/2006 |
| CN | 2872795 Y | 2/2007 |
| CN | 2874103 Y | 2/2007 |
| CN | 1933747 A | 3/2007 |
| CN | 2888807 Y | 4/2007 |
| CN | 1961157 A | 5/2007 |
| CN | 1985095 A | 6/2007 |
| CN | 1987033 A | 6/2007 |
| CN | 2915389 Y | 6/2007 |
| CN | 101002030 A | 7/2007 |
| CN | 101005741 A | 7/2007 |
| CN | 200941716 Y | 8/2007 |
| CN | 200957794 Y | 10/2007 |
| CN | 101131173 A | 2/2008 |
| CN | 101250964 A | 4/2008 |
| CN | 101390022 A | 3/2009 |
| CN | 201259846 Y | 6/2009 |
| CN | 201268336 Y | 7/2009 |

(56) References Cited

FOREIGN PATENT DOCUMENTS

| | | |
|---|---|---|
| CN | 201310827 Y | 9/2009 |
| CN | 101701595 A | 5/2010 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102463882 A | 5/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102918315 A | 2/2013 |
| CN | 102929022 A | 2/2013 |
| CN | 202764872 U | 3/2013 |
| CN | 103108681 A | 5/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 103591102 A | 2/2014 |
| CN | 104100609 A | 10/2014 |
| CN | 203991175 U | 12/2014 |
| DE | 1220673 B | 7/1966 |
| DE | 2527023 A1 | 12/1976 |
| DE | 2703897 A1 | 8/1978 |
| DE | 2809746 A1 | 9/1979 |
| DE | 3008990 A1 | 9/1980 |
| DE | 3704190 A1 | 12/1987 |
| DE | 3711696 A1 | 10/1988 |
| DE | 3805693 A1 | 2/1989 |
| DE | 69600357 T2 | 12/1998 |
| DE | 10003852 A1 | 8/2001 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102010026218 A1 | 1/2012 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| GB | 155838 | 3/1922 |
| GB | 994891 | 6/1965 |
| GB | 2175626 A | 12/1986 |
| GB | 2348924 A | 10/2000 |
| GB | 2496613 A | 6/2013 |
| JP | S6054264 A | 3/1985 |
| JP | H0861318 A | 3/1996 |
| JP | H08200420 A | 8/1996 |
| JP | H0942233 A | 2/1997 |
| JP | 2000010514 A | 1/2000 |
| JP | 2000192924 A | 7/2000 |
| JP | 2000287717 A | 10/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 A | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2010266519 A | 11/2010 |
| JP | 2011085174 A | 4/2011 |
| JP | 2012060791 A | 3/2012 |
| JP | 2012112533 A | 6/2012 |
| JP | 2012126421 A | 7/2012 |
| KR | 20030000251 A1 | 1/2003 |
| KR | 100931019 B1 | 12/2009 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2011089650 A1 | 7/2011 |
| WO | 2013088447 A1 | 6/2013 |
| WO | 2013191622 A1 | 12/2013 |
| WO | 2014062144 A1 | 4/2014 |
| WO | 2014119366 A1 | 8/2014 |

OTHER PUBLICATIONS

"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

Cross-sectional view of a prior art infrared welded assembly of BMW, Munich, Germany. Believed on the market since about Jan. 1, 2010.

China Office Action dated Jan. 30, 2014 for China Patent Application No. 201110349027.8; 8 pages.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

Office Action, Issued Apr. 15, 2015, MO90043CN.

CN Fifth Office Action dated Apr. 24, 2017 in Chinese Patent Application No. 201110349027.8, which is related to U.S. Appl. No. 13/229,926; 2 pages.

Fourth Office Action dated Nov. 28, 2016 in Chinese Patent Application No. 201110349027.8, which is related to U.S. Appl. No. 13/229,926; 9 pages.

(56) References Cited

OTHER PUBLICATIONS

Rojas, F.E., et al., "Kinematic Coupling for Precision Fixturing & Assembly" MIT Precision Engineering Research Group, Apr. 2013; 24 pgs.
Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.
Willoughby, P., "Elastically Averaged Precision Alignment", Degree of Doctor of Philosophy in Mechanical Engineering Dissertation, Massachusetts Institute of Technology, 2005; 158 pgs.

* cited by examiner

USING ELASTIC AVERAGING FOR ALIGNMENT OF BATTERY STACK, FUEL CELL STACK, OR OTHER VEHICLE ASSEMBLY

CROSS-REFERENCE TO RELATED APPLICATIONS

This application claims the benefit of U.S. Provisional Patent Application Ser. No. 61/411,614, filed on Nov. 9, 2010, the disclosure of which is hereby incorporated by reference.

TECHNICAL FIELD

The invention generally relates to a method of manufacturing an assembly for a vehicle, and more specifically to a method of using an average elastic deformation of elastically deformable features to secure and align a first member and a second member.

BACKGROUND

When manufacturing various different assemblies for a vehicle, it is often very important to precisely align a first member relative to a second member to align stacked assemblies or to achieve small, uniform gaps for function or appearance. The various different vehicular assemblies in which a first member must be precisely aligned with a second member may include, but are not limited to, multiple plates of a battery pack for an electric vehicle, multiple plates of a fuel cell pack for a hydrogen fuel cell, one or more components of a dashboard assembly relative to each other or a support structure, a body panel relative to the support structure, or a trim panel relative to the body panel.

The different members may be aligned with a datum reference structure, in which one or more surfaces of the different members are pressed against the datum reference structure to remove the various degrees of movement between the different members. Alternatively, locating features may be machined into or otherwise attached to the different members. However, in order to account for the part variations between the locating features, a certain amount of clearance must be designed into the locating features, which decreases the precision of the alignment.

SUMMARY

A method of manufacturing an assembly for a vehicle is provided. The method includes forming a first member to include a plurality of elastically deformable locating protrusions. The locating protrusions extend outward from an exterior surface of the first member. A second member is formed to define a cavity, and to include a plurality of elastically deformable compression features disposed within the cavity. The method further includes inserting the plurality of locating protrusions into the cavity in press fit engagement with the plurality of compression features. The press fit engagement between the locating protrusions and the compression features secures the first member and the second member relative to each other. The average of the elastic deformation between all of the plurality of locating protrusions and all of the plurality of compression features precisely aligns the first member relative to the second member.

An energy storage device is also provided. The energy storage device includes a plurality of members arranged face-to-face adjacent each other along a longitudinal axis to define a continuous stack of members. Each of the plurality of members includes a plurality of elastically deformable locating protrusions extending outward from a first face. Each of the plurality of members defines a cavity extending inward into a second face, opposite the first face, and includes a plurality of compression features disposed within the cavity. Each adjacent pair of the plurality of members include the plurality of locating protrusions of a first member disposed within the cavity of a second member such that elastic deformation of the plurality of compression features by the locating protrusions secures the first member and the second member relative to each other. The average of the elastic deformation between all of the plurality of locating protrusions of the first member and all of the compression features of the second member precisely aligns the first member relative to the second member along the longitudinal axis of the stack. Each of the plurality of locating protrusions on each of the members extends outward from an outer surface of each member along a central axis. Each of the locating protrusions includes a cross sectional shape perpendicular to their respective central axis that defines one of a circular shape, a heptagon shape, an octagon shape, a decagon shape, or a dodecagon shape. The plurality of compression features includes a combination of at least one compression protrusion, at least one compression rib, and at least one compression ridge.

Accordingly, the interference fit engagement between the locating protrusions of the first member and the compression features of the second member secure the first member and the second member together during manufacture of the assembly. The plurality of elastically deformable locating protrusions and the plurality of elastically deformable compression features define multiple points of contact between the first member and the second member. Accordingly, the average of the elastic deformation between the locating protrusions and the compression features provides a precise and highly repeatable alignment of the first member relative to the second member, thereby precisely positioning the first member relative to the second member without the need of expensive datum alignment tools. The multiple contacts also increase the structural stiffness of the connection.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, an assembly for a vehicle is shown generally at 20. As shown herein, the assembly 20 includes an energy storage device 22, such as but not limited to a battery pack or a fuel cell pack. However, the assembly 20 may include some other vehicular assembly 20 not shown or described herein, including but not limited to a dashboard assembly 20 or a body panel assembly 20. Although the invention disclosed herein is described incorporated into the energy storage device 22, it should be appreciated that the invention may be incorporated into other vehicular assemblies 20, and that the energy storage device 22 is simply described as an exemplary embodiment of a vehicular assembly 20 including the invention.

Figure 1:
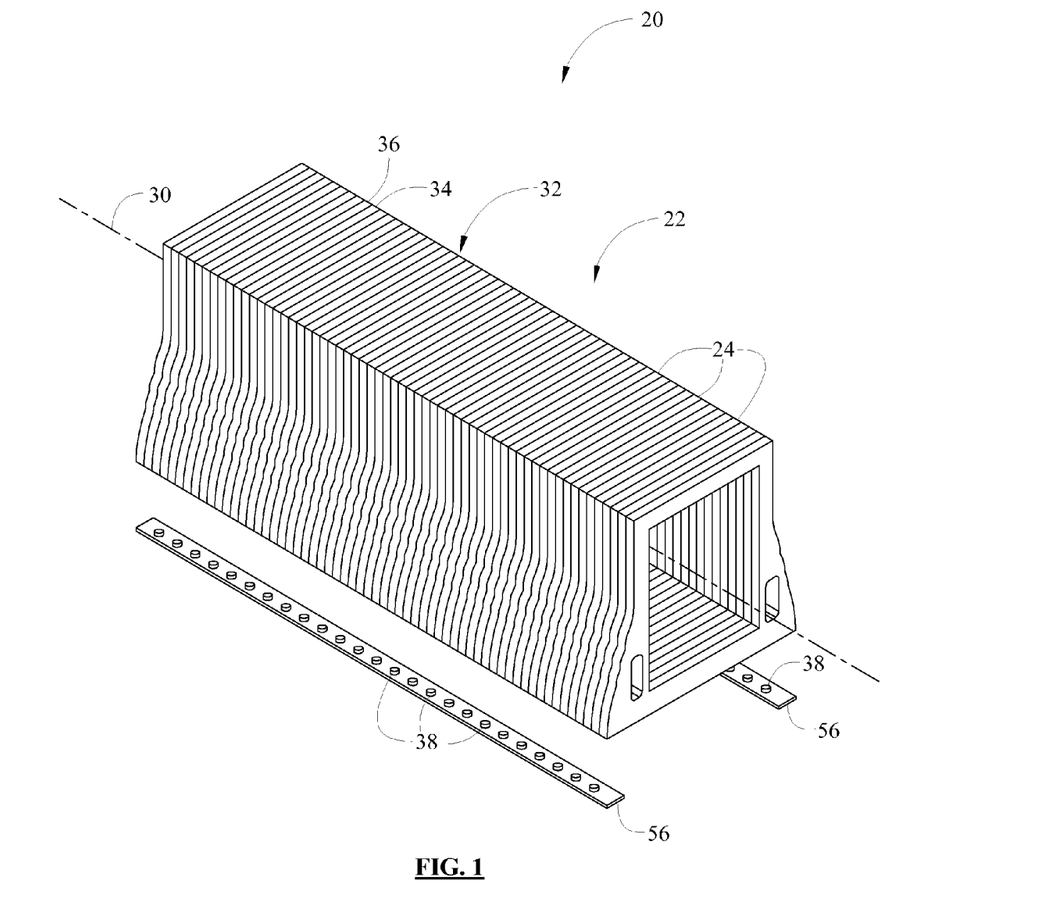
FIG. 1 is a schematic perspective view of an assembly for a vehicle, wherein the assembly includes an energy storage device manufactured from a plurality of members.
Figure 2:
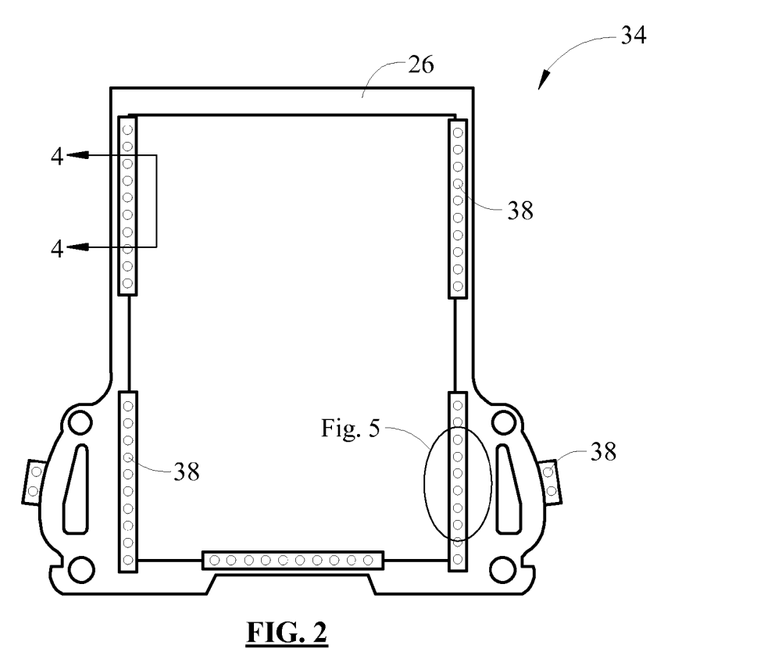
FIG. 2 is a schematic plan view of a first face of one of the members of the energy storage device shown in FIG. 1.
Figure 3:
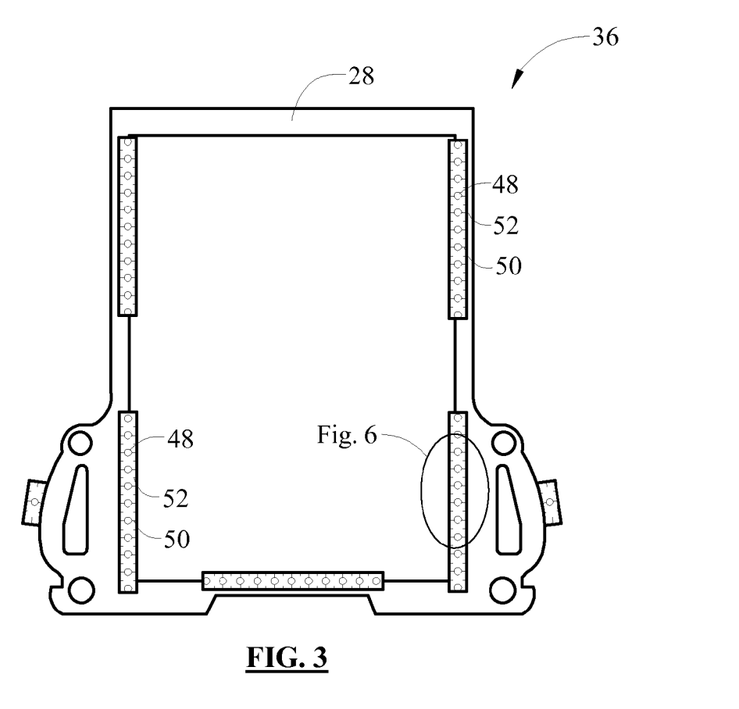
FIG. 3 is a schematic plan view of a second face of one of the members of the energy storage device shown in FIG. 1.

Referring to FIGS. 1 through 3, the energy storage device 22 includes a plurality of generally planar members 24. Each of the members includes a first face 26, shown in FIG. 2, and a second face 28, shown in FIG. 3. The first face 26 and the second face 28 of the plurality of planar members 24 are defined by opposing, i.e., opposite, surfaces of each of the planar members 24. The plurality of planar members 24 are arranged face-to-face adjacent each other along a longitudinal axis 30 to define a continuous stack 32 of planar members 24. Accordingly, each first face 26 of one of the planar members 24 is disposed adjacent a second face 28 of another of the planar members 24. The stack 32 of planar members 24 may include any number of planar members 24. For example, the energy storage device 22 may include several hundred of the planar members 24. It should be appreciated that the exposed face of the end members of the stack 32 are not disposed adjacent other planar members 24.

For the purpose of describing the invention, the plurality of planar members 24 is described herein in terms of a first member 34, shown in FIG. 2, and a second member 36, shown in FIG. 3. However, it should be appreciated that the stack 32 of planar members 24 may include, but is not required to include, more than the first member 34 and the second member 36, and that the description of the first member 34 and the second member 36 is applicable to all of the plurality of planar members 24.

Figure 4:
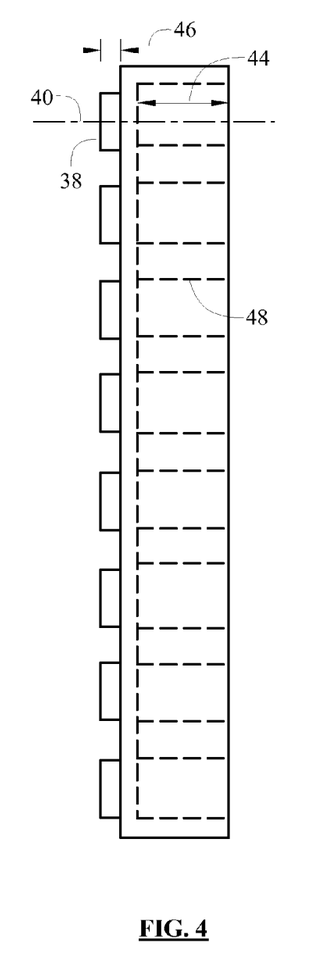
FIG. 4 is a schematic side view of a portion of one of the members of the energy storage device taken along cut line 4-4 shown in FIG. 2.
Figure 5:
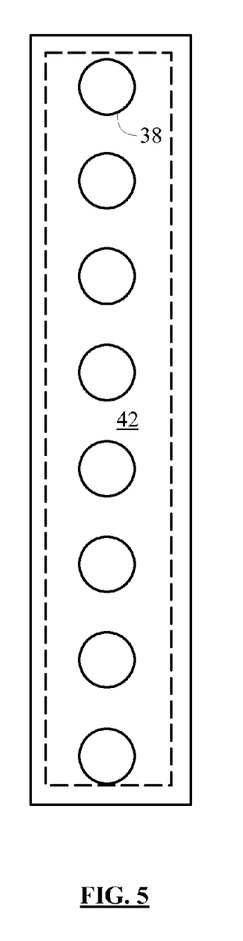
FIG. 5 is an enlarged schematic plan view of a portion of one of the members of the energy storage device shown in FIG. 2 showing a plurality of locating protrusions.
Figure 6:
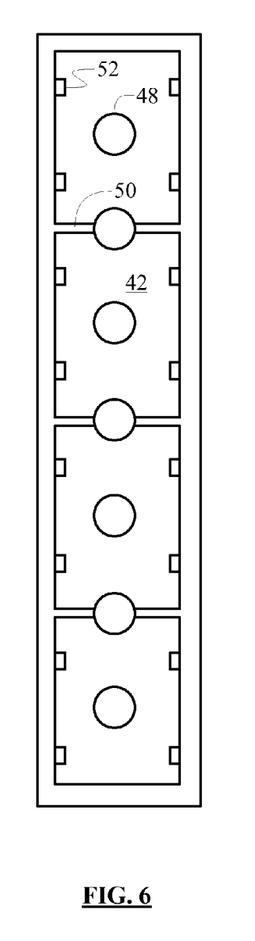
FIG. 6 is an enlarged schematic plan view of a portion of one of the members of the energy storage device shown in FIG. 3 showing a plurality of compression features.
Figure 7:
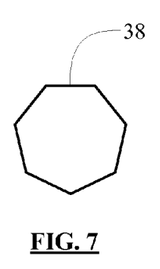
FIG. 7 is a schematic plan view of a first alternative shape of one of the locating protrusions.
Figure 8:
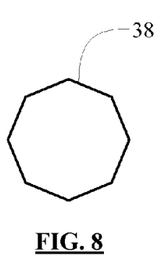
FIG. 8 is a schematic plan view of a second alternative shape of one of the locating protrusions.
Figure 9:
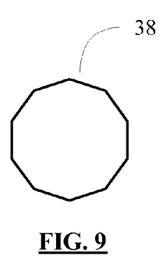
FIG. 9 is a schematic plan view of a third alternative shape of one of the locating protrusions.
Figure 10:
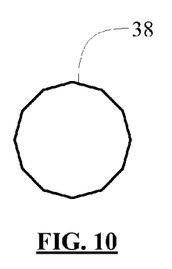
FIG. 10 is a schematic plan view of a fourth alternative shape of one of the locating protrusions.

Referring also to FIGS. 4 through 6, each of the first member 34 and the second member 36 may include a plurality of elastically deformable locating protrusions 38 extending outward from an outer surface of the first face 26. The locating protrusions 38 on the first member 34 and the second member 36 extend outward from the first face 26 of each member along a central axis 40 of each of the locating protrusions 38 respectively. Each of the locating protrusions 38 includes a cross sectional shape perpendicular to their respective central axis 40. The cross sectional shape of the locating protrusions 38 may define, but is not limited to, one of a circular shape shown in FIG. 4, a heptagon shape shown in FIG. 7, an octagon shape shown in FIG. 8, a decagon shape shown in FIG. 9, or a dodecagon shape shown in FIG. 10. The various locating protrusions 38 may also be of different sizes or varying scales within the same assembly 20 and or members 24, incorporating both a coarse and fine locating sequence.

Each of the first member 34 and the second member 36 may define a cavity 42 extending inward into the second face 28 of the first member 34 and the second member 36 respectively. Preferably, the cavity 42 extends inward a depth 44 that is equal to or greater than a length 46 of the locating protrusions 38. Each of the first member 34 and the second member 36 may further include a plurality of compression features 48, 50, 52 disposed within the cavity 42 of the first member 34 and the second member 36 respectively. The plurality of compression features 48, 50, 52 may include but are not limited to a combination of at least one compression protrusion 48, at least one compression rib 50, and at least one compression ridge 52. Each compression protrusion 48 is a generally cylindrical shaft that extends along an axis that is parallel with the central axis 40 of each of the locating protrusions 38 respectively. Each compression rib 50 is an intermediate or interior wall that extends between opposing side walls of the first member 34 and the second member 36 respectively, and that extends along plane that is parallel with the central axis 40 of each of the locating protrusions 38 respectively. Each compression ridge 52 is a ridge of material disposed peripherally about the side walls of the first member 34 and the second member 36 respectively, and that extend along a line parallel with the central axis 40 of each of the locating protrusions 38 respectively inward toward a center of the cavity 42. The compression protrusions 48, the compression ribs 50 and the compression ridges 52 are all spaced from each other to define at least one region therebetween that is substantially equal to yet slightly smaller than one of the locating protrusions 38. Accordingly, insertion of the locating protrusions 38 into the region between the various compression features 48, 50, 52 forces the locating protrusion 38 and/or at least one of the compression features 48, 50, 52 to compress.

Accordingly, each of the first member 34 and the second member 36 are preferably identical, with each of the first member 34 and the second member 36 including a plurality of elastically deformable locating protrusions 38, and each of the first member 34 and the second member 36 defining a cavity 42 and including a plurality of elastically deformable compression features 48, 50, 52 disposed within their respective cavities.

The locating protrusions 38 and the compression features 48, 50, 52 include and are manufactured from an elastically deformable material. For example, the locating protrusions 38 and the compression features 48, 50, 52 may include and be manufactured from a polymer material, including but not limited to a plastic. Additionally, the locating protrusions 38 may include, but are not required to include, an active material capable of changing between a first shape and a second shape in response to a signal, such as but not limited to an electrical signal or a thermal signal. As described in greater detail below, upon applying the signal, the active material forming the locating protrusions 38 changes from a non-energized shape into a temporary, energized shape, i.e., the first shape. Upon removal of the signal, the active material changes back to the non-energized shape, e.g., the second shape.

Each adjacent pair of members, i.e., the first member 34 and the second member 36, includes the locating protrusions 38 of the first member 34 disposed within the cavity 42 of the second member 36. The locating protrusions 38 of the first member 34 are disposed within the cavity 42 of the second member 36 in press fit engagement with the compression features 48, 50, 52 of the second member 36. Insertion of the locating protrusions 38 into the cavity 42 elastically deforms one of the locating protrusions 38 and/or one of the compression features 48, 50, 52. The elastic deformation between each of the locating protrusions 38 and at least one of the compression features 48, 50, 52 secures the first member 34 and the second member 36 together, relative to each other. The average of the elastic deformation between all of the locating protrusions 38 of the first member 34 and all of the compression features 48, 50, 52 of the second member 36 precisely and consistently aligns the first member 34 relative to the second member 36 along the longitudinal axis 30 of the stack 32.

While the invention has so far been described to include multiple identical members, each defining both the locating protrusions 38 and the compression features 48, 50, 52, it should be appreciated that the members need not be identical. For example, as shown in FIG. 1, the assembly 20 may include each of the generally planar members 24 defining one of the locating features and the compression features 48, 50, 52, with an elongated member 56 defining the other of the locating features and the compression features 48, 50, 52. As shown, the generally planar members 24 define the compression features 48, 50, 52, with the elongated member 56 defining the locating protrusions 38. The elongated member 56 spans a length 46 of the stack 32 of planar members 24, thereby securing the generally planar members 24 together and positioning the generally planar members 24 relative to each other.

A method of manufacturing the assembly 20 is provided. While the method is described relative to the exemplary energy storage device 22 shown in the drawings, it should be appreciated that the scope of the method is not limited to the manufacture of the energy storage device 22, but is also applicable to the manufacture of other assemblies 20.

The method includes forming the first member 34 to include the plurality of elastically deformable locating protrusions 38. The first member 34 is formed such that the locating protrusions 38 extend outward from the exterior surface, i.e., the first face 26, of the first member 34. The locating protrusions 38 may be formed in any desirable area of the first face 26. Preferably, the locating protrusions 38 are formed in areas having a critical alignment requirement, including but not limited to cooling channels, side profiles, tie rod holes, battery cells, seal areas, etc.

Forming the first member 34 may include forming the plurality of locating protrusions 38 integrally with the first member 34 from a common material. For example, the first member 34 and the locating protrusions 38 may be formed through a plastic injection molding process or the like from a polymer, i.e., plastic material. Alternatively, the first member 34 and the locating protrusions 38 may be machined into the first member 34 through conventional machining processes.

Alternatively, forming the first member 34 to include the plurality of locating protrusions 38 may include forming the locating protrusions 38 separately from the first member 34. The separate and distinct locating protrusions 38 may be formed from the same material used for the first member 34, or alternatively, may be formed from a different material than used to form the first member 34, such as but not limited to an active material. If the locating protrusions 38 are formed separately from the first member 34, then forming the first member 34 to include the plurality of locating protrusions 38 includes mounting the locating protrusions 38 to the pre-formed first member 34. The locating protrusions 38 may be mounted in any suitable manner, such as but not limited to fasteners, chemical bonding, welding, or over molding. For example, if the locating protrusions 38 are formed separately from the first member 34, then, forming the locating protrusions 38 separately from the first member 34 may include over molding the plurality of locating protrusions 38 onto the pre-formed first member 34.

The method further includes forming the second member 36 to define a cavity 42, and to include the plurality of elastically deformable compression features 48, 50, 52 disposed within the cavity 42. As described above, each member may include both the locating protrusions 38 on the first face 26 and the cavity 42 with the compression features 48, 50, 52 therein on the second face 28, or may alternatively include separate members, such as the elongated member 56 described above. The cavity 42 with the compression features 48, 50, 52 are formed in positions along the second member that generally correspond to and align with the locating projections 38 of the first member 34.

Forming the second member 36 may include forming the plurality of compression features 48, 50, 52 integrally with the second member 36 from a common material. For example, the second member 36 and the compression features 48, 50, 52 may be formed through a plastic injection molding process or the like from a polymer, i.e., plastic material. Alternatively, the second member 36 and the compression features 48, 50, 52 may be machined into the second member 36 through conventional machining processes.

The method further includes inserting the locating protrusions 38 of the first member 34 into the cavity 42 of the second member 36 in press fit engagement with the plurality of compression features 48, 50, 52. Inserting the plurality of locating protrusions 38 into the cavity 42 in press fit engagement includes elastically deforming the locating protrusions 38 and/or at least one of the compression features 48, 50, 52. In so doing, the elastic deformation of the locating protrusion 38 and/or at least one of the compression features 48, 50, 52 secures the first member 34 and the second member 36 relative to each other. Additionally, the average of the elastic deformation between all of the plurality of locating protrusions 38 and all of the plurality of compression features 48, 50, 52 precisely and repeatably aligns the first member 34 relative to the second member 36.

If the material used to form the plurality of locating protrusions 38 includes an active material, in which the active material locating protrusions 38 include a first shape when in the energized state, and a second shape when in the de-energized shape, then the method further includes energizing the locating protrusions 38 to cause each of the plurality of locating protrusions 38 to change into the first shape prior to inserting the plurality of locating protrusions 38 into the cavity 42. The method further includes de-energizing the locating protrusions 38 to cause each of the locating protrusions 38 to change into the second shape after the plurality of locating protrusions 38 are inserted into the cavity 42. If the second shape is an initial and/or final shape, and the first shape is a temporary installation shape, then energizing the locating protrusions 38 causes the shape of the locating protrusions 38 to change from the initial shape, i.e., the second shape, into the temporary installation shape, i.e., the first shape. Upon the locating protrusions 38 being inserted into the cavity 42 and into engagement with the compression features 48, 50, 52, the locating protrusions 38 may be de-energized to cause the locating protrusions 38 to thereby change back into the initial and/or final shape.

Figure 11:
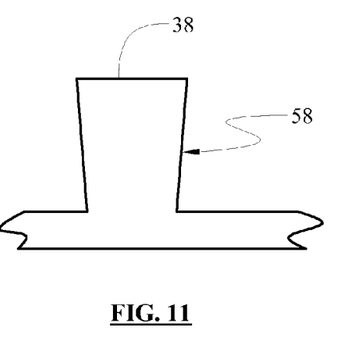
FIG. 11 is an enlarged schematic side view of one of the plurality of the locating protrusions manufactured from an active material, and shown in an initial and/or final shape.

For example, the first shape, e.g. the temporary installation shape, may include but is not limited to a cylindrical shape, and the second shape, e.g., the initial and/or final shape, may include but is not limited to an inverted taper, shown generally at 58 in FIG. 11, extending along the central axis 40 of each respective locating protrusion 38. Accordingly, the inverted taper of the locating protrusions 38 may wedge into or otherwise more firmly grasp the compression features 48, 50, 52 to better secure the locating protrusions 38 within the cavity 42.

Once the locating protrusions 38 are inserted into the cavities into press fit engagement with the compression features 48, 50, 52, then the method may further include fixing the first member 34 and the second member 36 together. Fixing the first member 34 and the second member 36 may include permanently attaching the first member 34 and the second member 36 together. The first member 34 and the second member 36 may be permanently attached in any suitable manner specific to the type of assembly 20 being manufactured. For example, fixing the first member 34 and the second member 36 together may include but is not limited to fastening the first member 34 and the second member 36 together with a fastener, welding the first member 34 and the second member 36 together, or bonding the first member 34 and the second member 36 together with a chemical adhesive. In so doing, the press-fit engagement between the locating protrusions 38 of the first member 34 and the compression features 48, 50, 52 of the second member 36 are only intended to be a temporary alignment and attachment, with the final and permanent attachment being achieved through other fixing processes. While the best modes for carrying out the invention have been described in detail, those familiar with the art to which this invention relates will recognize various alternative designs and embodiments for practicing the invention within the scope of the appended claims.

The invention claimed is:

1. A method of manufacturing an assembly for a vehicle, the method comprising:
    forming a first member to include a plurality of elastically deformable locating protrusions extending outward from an exterior surface of the first member, the forming the first member to include the plurality of elastically deformable locating protrusions comprises forming a first set and a second set of the plurality of elastically deformable locating protrusions;
    forming a second member to define a cavity and to include a plurality of elastically deformable compression features disposed within the cavity, the forming the second member to include the plurality of elastically deformable compression features comprises forming a first set and a second set of the plurality of elastically deformable compression features;
    the respective first sets and the respective second sets of the plurality of elastically deformable locating protrusions and the plurality of elastically deformable compression features being spaced apart from each other;
    inserting the plurality of elastically deformable locating protrusions into the cavity in press fit engagement with the plurality of elastically deformable compression features such that at least one of the plurality of elastically deformable locating protrusions and at least one of the plurality of elastically deformable compression features are elastically deformed to align the first member relative to the second member according to an average of the elastic deformation between all of the elastically deformed locating protrusions and compression features.

2. A method as set forth in claim 1 further comprising fixing the first member and the second member together.

3. A method as set forth in claim 2 wherein fixing the first member and the second member together includes fastening the first member and the second member together with a fastener.

4. A method as set forth in claim 2 wherein fixing the first member and the second member together includes welding the first member and the second member together.

5. A method as set forth in claim 2 wherein fixing the first member and the second member together includes bonding the first member and the second member together with a chemical adhesive.

6. A method as set forth in claim 1 wherein forming the first member includes forming the plurality of elastically deformable locating protrusions integrally with the first member from a common material.

7. A method as set forth in claim 6 wherein the first member and the plurality of elastically deformable locating protrusions are integrally formed together from a polymer material.

8. A method as set forth in claim 1 wherein forming the second member includes forming the plurality of elastically deformable compression features integrally with the second member from a common material.

9. A method of manufacturing an assembly for a vehicle, the method comprising:
    forming a first member to include a plurality of elastically deformable locating protrusions extending outward from an exterior surface of the first member;
    forming a second member to define a cavity and to include a plurality of elastically deformable compression features disposed within the cavity;
    inserting the plurality of elastically deformable locating protrusions into the cavity in press fit engagement with the plurality of elastically deformable compression features such that at least one of the plurality of elastically deformable locating protrusions and at least one of the plurality of elastically deformable compression features are elastically deformed to align the first member relative to the second member according to an average of the elastic deformation between all of the elastically deformed locating protrusions and compression features;
    the forming the second member includes forming the plurality of elastically deformable compression features integrally with the second member from a common material, the second member and the plurality of elastically deformable compression features are integrally formed together from a polymer material.

10. A method as set forth in claim 9 wherein forming the first member to include the plurality of elastically deformable locating protrusions includes forming each of the plurality of elastically deformable locating protrusions separately from and from a different material than the first member.

11. A method as set forth in claim 10 wherein forming each of the plurality of elastically deformable locating protrusions separately from and from the different material than the first member includes over molding the plurality of elastically deformable locating protrusions onto a preformed first member.

12. A method as set forth in claim 10 wherein forming the first member to include the plurality of elastically deformable locating protrusions includes mounting the elastically deformable locating protrusions to a pre-formed first member.

13. A method as set forth in claim 12 wherein the material used to form the plurality of elastically deformable locating protrusions includes an active material having a first shape when in an energized state and a second shape when in a de-energized shape.

14. A method as set forth in claim 13 further comprising energizing the plurality of elastically deformable locating protrusions to cause each of the plurality of elastically deformable locating protrusions to change into the first shape prior to inserting the plurality of elastically deformable locating protrusions into the cavity.

15. A method as set forth in claim 14 further comprising de-energizing the plurality of elastically deformable locating protrusions to cause each of the plurality of elastically deformable locating protrusions to change into the second shape after the plurality of elastically deformable locating protrusions are inserted into the cavity.

16. A method as set forth in claim 15 wherein the first shape includes a cylindrical shape.

17. A method as set forth in claim 15 wherein the second shape includes an inverted taper extending along the central axis of each respective elastically deformable locating protrusion.

18. A method of manufacturing an assembly for a vehicle, the method comprising:
    forming a first member to include a plurality of elastically deformable locating protrusions extending outward from an exterior surface of the first member;
    forming a second member to define a cavity and to include a plurality of elastically deformable compression features disposed within the cavity;
    inserting the plurality of elastically deformable locating protrusions into the cavity in press fit engagement with the plurality of elastically deformable compression features such that at least one of the plurality of elastically deformable locating protrusions and at least one of the plurality of elastically deformable compression features are elastically deformed to align the first member relative to the second member according to an average of the elastic deformation between all of the elastically deformed locating protrusions and compression features;
    wherein each of the first member and the second member have a structure that is the same, with each of the first member and the second member including a plurality of elastically deformable locating protrusions, and each of the first member and the second member defining a cavity and including a plurality of elastically deformable compression features disposed within their respective cavities.

19. A method as set forth in claim 1 wherein:
    the forming the first member to include the plurality of elastically deformable locating protrusions further comprises, forming a third set and a fourth set of the plurality of elastically deformable locating protrusions;
    the forming the second member to include the plurality of elastically deformable compression features further comprises, forming a third set and a fourth set of the plurality of elastically deformable compression features;
    the respective third sets and the respective fourth sets of the plurality of elastically deformable locating protrusions and the plurality of elastically deformable compression features being spaced apart from each other, and being spaced apart from the respective first sets and the respective second sets of the plurality of elastically deformable locating protrusions and the plurality of elastically deformable compression features; and
    the respective first sets, second sets, third sets, and fourth sets of the plurality of elastically deformable locating protrusions and the plurality of elastically deformable compression features being disposed proximate a periphery of the respective first and second members.

* * * * *

UNITED STATES PATENT AND TRADEMARK OFFICE
CERTIFICATE OF CORRECTION

PATENT NO. : 9,812,684 B2
APPLICATION NO. : 13/229926
DATED : November 7, 2017
INVENTOR(S) : Mark A. Smith et al.

Page 1 of 1

It is certified that error appears in the above-identified patent and that said Letters Patent is hereby corrected as shown below:

In the Specification

Column 1, Line 5, please add the following paragraph between the Title and Cross-Reference to Related Applications:

--STATEMENT REGARDING FEDERALLY SPONSORED RESEARCH OR DEVELOPMENT
This invention was made with Government support under Government Program No. DE-EE0002217 awarded by the United States Department of Energy. The Government has certain rights in this invention.--

Signed and Sealed this
Twenty-fourth Day of September, 2019

Andrei Iancu
*Director of the United States Patent and Trademark Office*